United States Patent [19]
Thomas
[11] 3,862,375
[45] Jan. 21, 1975

[54] TELEPHONE

[76] Inventor: Wesley L. Thomas, 109 S. Catalina, Los Angeles, Calif. 90004

[22] Filed: July 23, 1973

[21] Appl. No.: 381,691

[52] U.S. Cl. .............................. 179/100 R, 179/179
[51] Int. Cl. .............................................. H04m 1/02
[58] Field of Search ........ 179/100 R, 100 C, 100 L, 179/179; D26/14 A

[56] References Cited

UNITED STATES PATENTS

| | | | |
|---|---|---|---|
| 613,533 | 11/1898 | Sparks | 179/100 R |
| 958,925 | 5/1910 | Kaisling | 179/100 R |
| 1,590,355 | 6/1926 | Erickson et al. | 179/100 R |
| 2,494,450 | 1/1950 | Obergfell | 179/100 C |

OTHER PUBLICATIONS

American Builder, page 116, January 1959.

*Primary Examiner*—Kathleen H. Claffy
*Assistant Examiner*—Randall P. Myers
*Attorney, Agent, or Firm*—Jessup & Beecher

[57] ABSTRACT

A telephone is provided which simulates the old-fashioned crank-type of wall telephone in all respects, and yet which is constructed for modern dial or touch tone operation. The telephone includes a rectangular housing which is intended to be mounted on the wall, and which has a rectangular hinged cover. A present day telephone chassis is mounted within the housing, and is connected to appropriate transducers. The transducers are mounted within the usual old-fashioned earpiece and transmitter housing of the telephone. The mouthpiece is mounted on the front of the transmitter housing, and the earpiece is removably supported on the usual hook switch at one side of the housing. The usual crank of the old-fashioned telephone is mounted on the opposite side of the housing to the hook switch. A modern telephone dial control, or the equivalent touch tone control, is hidden under a shelf which forms part of the old-fashioned telephone, but which is hinged to permit it to be turned down for access to the dial or touch tone control.

6 Claims, 3 Drawing Figures

Patented Jan. 21, 1975

3,862,375

3 Sheets-Sheet 2

TELEPHONE

BACKGROUND OF THE INVENTION

The old-fashioned crank-type wall telephones of the early 1920's have wide present day popularity as antiques, and are sold as such through the country. The present invention provides a telephone which simulates in all respects the old-fashioned telephone, and yet which is constructed for present day operation, without in any way changing the outward appearance of the old-fashioned telephone.

DETAILED DESCRIPTION OF THE ILLUSTRATED EMBODIMENT

Figure 1:
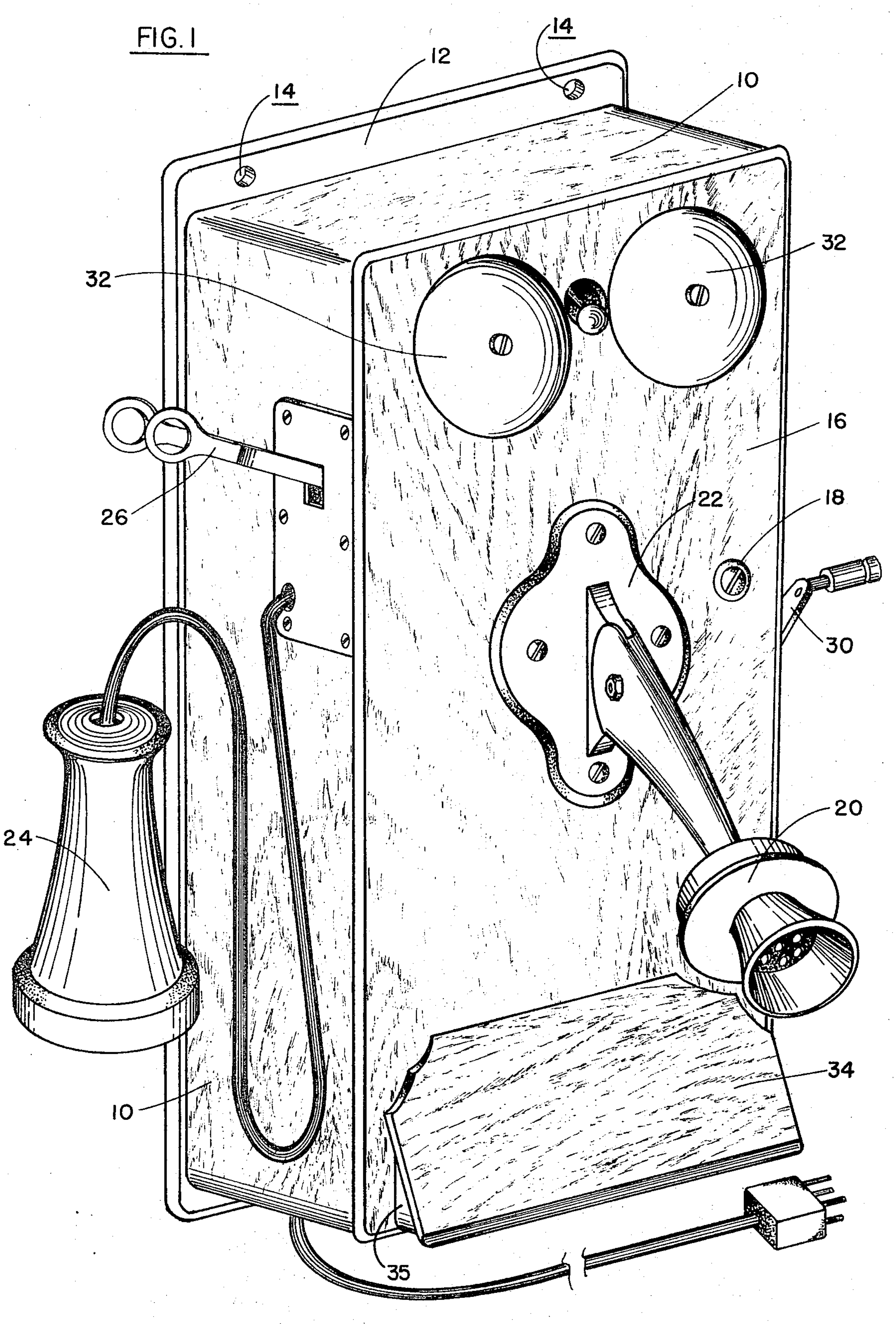
FIG. 1 is a perspective representation of the old-fashioned crank-type wall telephone which has been adapted for present day operation in accordance with the invention.

The telephone illustrated in the drawings includes a housing 10 which has a rectangular configuration, and which is preferably formed of wood, or plastic simulating wood, so that it may have all the appearance of the old-fashioned crank-type wall telephone. The housing 10 has a rear panel 12 which is equipped with holes 14 to enable the telephone to be mounted on a vertical wall. The housing also has a front door 16 which is hinged to the housing, and which is held closed by a usual screw 18.

A transmitter 20 is mounted to the front door 16 by a usual old-fashioned bracket 22. A receiver, or earpiece, 24 has a well known shape so that it may be removably supported by a usual hook 26. A crank 30 is mounted on the opposite side of the housing 10 from the hook 26. The old-fashioned telephone bells 32 are mounted on the front door 16, in accordance with the usual construction of the type of telephone being simulated. Also, as is usual in the old-fashioned telephones of the type illustrated in FIG. 1, a shelf 34 is provided at the lower end of the door 16, the shelf being mounted on an angular bracket 35.

Figure 2:
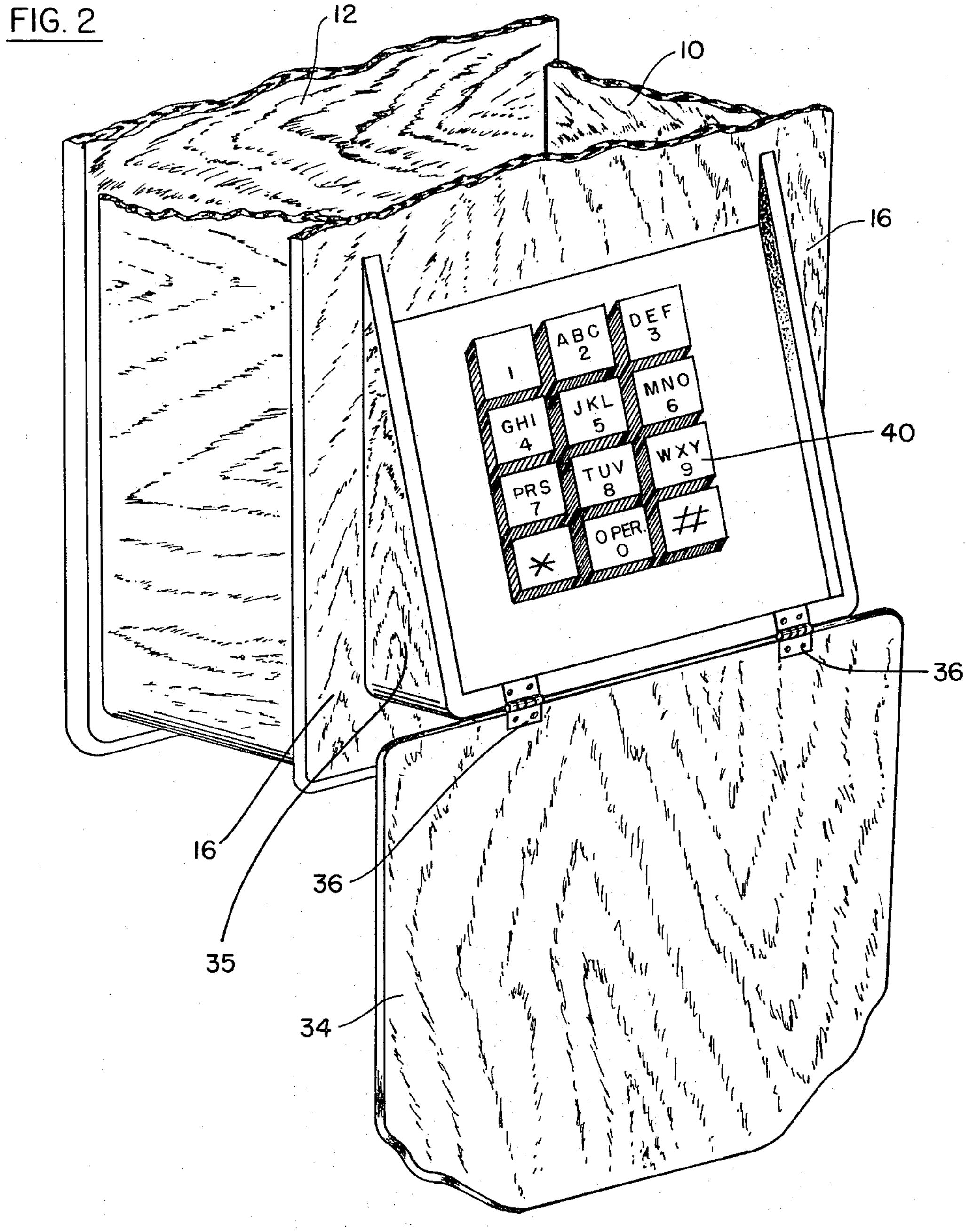
FIG. 2 is a fragmentary view of the telephone of FIG. 1, and showing a shelf component turned down to reveal a normally hidden modern touch tone telephone control unit.

In accordance with the invention, and as best shown in FIG. 2, the shelf 34 is hinged to the bracket 35 by means of a pair of hinges 36, and it may be turned down, such as shown in FIG. 2, to permit access to a modern telephone touch tone unit 40, or equivalent dial, which is mounted in the bracket 35. The unit 40 is inclined to the vertical, as shown, to facilitate its use.

Figure 3:
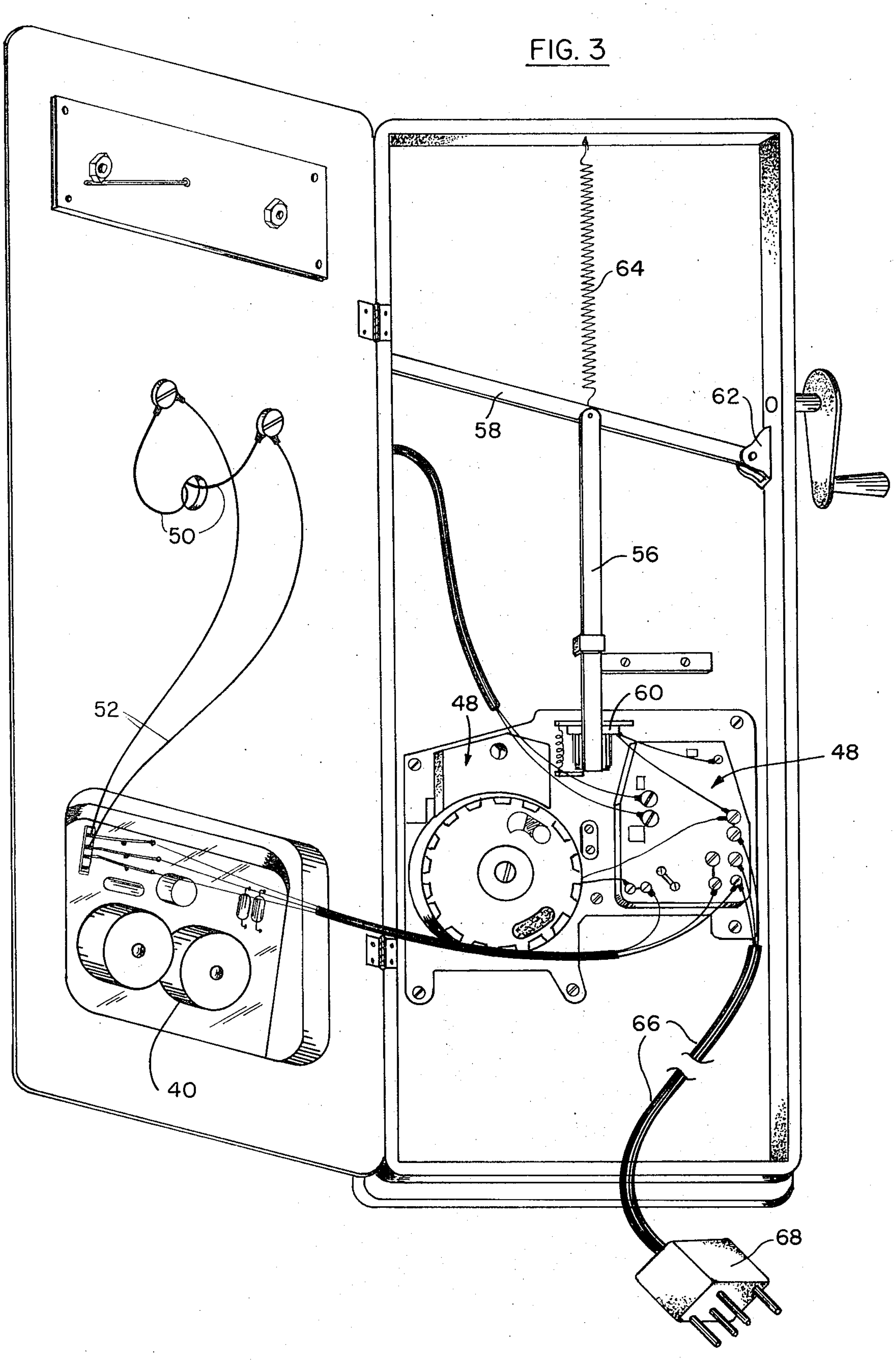
FIG. 3 show the telephone of FIG. 1, with its cover in an open position to reveal the internal set base of a modern telephone, the set base being connected to the transmitter and earpiece of the old-fashioned telephone, and having a cord for connection to the telephone line.

A modern telephone set base 48 is mounted in the housing as shown in FIG. 3, and the electrical components on the base are connected to the transducers in the transmitter housing 20 and earpiece 24 by appropriate electrical connections, as designated 50 in FIG. 3. Also, the electrical components are connected through appropriate electrical connections 52 to the touch tone unit 40, or its equivalent. A vertical bar 56 operates switching contacts 60, of the modern telephone set base 48 to make or break connections in the telephone electrical system. The bar 56 is coupled to a bar 58. The bar 58 is pivoted at one end to a bracket 62. The bar 58 is spring biased upwardly by a spring 64. The free end of the bar 58 is connected to the hook 26. When the receiver 24 is lifted off the hook 26, the spring 64 pulls the bar 56 upwardly to operate the switch 60.

The electrical components on the set base 48, and in the transmitter housing 20 and earpiece 24, are connected to a cord 66 which is plugged into the telephone line by a usual plug 68.

The invention provides, therefore, a telephone which in no way departs from the appearance of the old-fashioned telephone, as represented in FIG. 1. Yet the telephone of the invention is capable of modern operation, and calls may be made, merely by turning down the shelf 34 to make the dial or touch tone control unit 40 accessible. In other respects, the telephone is fully operational as a modern telephone.

It will be appreciated that although a particular embodiment of the invention has been shown and described, modifications may be made. It is intended in the following claims to cover the modifications which come within the spirit and scope of the invention.

What is claimed is:

1. A telephone assembly including a rectangular housing shaped to be mounted on a vertical wall, a rectangular front door hinged to the housing, a telephone transmitter mounted on the front door, a hook mounted on the side of the housing, a telephone receiver shaped to be removably supported by the hook, and an electrical telephone set base with electrical components thereon mounted within the housing, an electric cord connected to said electrical components on said base to connect the electrical components to a telephone line, electrical connections from the electrical components on the base to the receiver and to the transmitter, a movable shelf mounted under the transmitter on the front surface of the door to form an enclosure, and a manually operated telephone control touch tone unit or dial mounted on the door within said enclosure and electrically connected to said electrical components on said base in the housing, said control touch tone unit or dial being normally covered by the shelf and made accessible when the shelf is moved to an open position on the door.

2. The telephone defined in claim 1, and which includes angle bracket means for mounting said control touch tone unit or dial in an inclined position on said door.

3. The telephone defined in claim 1, and which includes a plug connected to the remote end of the cord for plugging the telephone chassis into the telephone line.

4. The telephone defined in claim 1, and which includes bells mounted on the front surface of the door, and a crank mounted on the opposite side of the housing to said hook switch.

5. The telephone defined in claim 1, in which the electrical components on said set base include an electrical switch; and mechanical means coupling said hook to said switch to cause the switch to be operated when the receiver is placed on or removed from said hook.

6. The telephone defined in claim 1, in which said shelf is hinged to the front surface of the door to be turned away from the plane of the door when moved to its open position.

* * * * *